US012766624B2

(12) United States Patent
Jochman

(10) Patent No.: US 12,766,624 B2
(45) Date of Patent: Oct. 20, 2026

(54) METHODS AND SYSTEMS FOR FUEL FILL DEVICE WITH INTEGRATED VENTING FOR ATTACHMENT TO FUEL TANK

(71) Applicant: Illinois Tool Works Inc., Glenview, IL (US)

(72) Inventor: Nathan Joe Jochman, Neenah, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1024 days.

(21) Appl. No.: 17/955,873

(22) Filed: Sep. 29, 2022

(65) Prior Publication Data

US 2023/0099892 A1 Mar. 30, 2023

Related U.S. Application Data

(60) Provisional application No. 63/250,617, filed on Sep. 30, 2021.

(51) Int. Cl.
*B23K 9/10* (2006.01)
*F02B 63/00* (2006.01)

(52) U.S. Cl.
CPC ............ *B23K 9/1006* (2013.01); *F02B 63/00* (2013.01)

(58) Field of Classification Search
CPC .......... B23K 9/10; B23K 9/32; B23K 9/1087; B23K 9/173; B23K 9/1006; B23K 9/1012; B23K 9/1062; B23K 9/1043; F02B 63/00; F02B 63/04; F02B 63/044
See application file for complete search history.

(56) References Cited

U.S. PATENT DOCUMENTS

| | | | | |
|---|---|---|---|---|
| 8,935,995 B1 * | 1/2015 | Hawkins | F02B 63/048 123/3 |
| 2003/0056837 A1 * | 3/2003 | Benjey | B60K 15/04 137/587 |
| 2008/0202447 A1 * | 8/2008 | Kochi | F02B 63/04 290/1 A |

FOREIGN PATENT DOCUMENTS

FR 3036663 12/2016

OTHER PUBLICATIONS

1 Canadian Office Action Appln. No. 3,178,014 dated Mar. 18, 2024.
Canadian Office Action Appln. No. 3,178,014 dated Jul. 16, 2025.

* cited by examiner

*Primary Examiner* — Brian W Jennison
(74) *Attorney, Agent, or Firm* — McAndrews Held & Malloy, Ltd.

(57) ABSTRACT

An example fluid container configured to receive a fluid, with a filler neck configured to channel the fluid from an inlet into the fluid container. In some examples, a flexible hose connects the fluid container to the filler neck.

20 Claims, 4 Drawing Sheets

METHODS AND SYSTEMS FOR FUEL FILL DEVICE WITH INTEGRATED VENTING FOR ATTACHMENT TO FUEL TANK

CROSS-REFERENCE TO RELATED APPLICATIONS

This application hereby claims priority to and the benefit of U.S. Provisional Application Ser. No. 63/250,617, entitled "Methods And Systems For Fuel Fill Device With Integrated Venting For Attachment To Fuel Tank," filed Sep. 30, 2021. The above listed U.S. Application is hereby incorporated by reference in its entireties for all purposes.

BACKGROUND

Conventional fuel tanks or other fuel containers are formed as a single, inflexible unit. Typically, a fuel inlet or neck is rigidly attached to the fuel tank, which is used to fill the fuel tank. However, use of a rigidly attached fuel inlet makes it difficult to accommodate imprecise openings, and requires additional space for packaging and shipping, which may lead to damage to the fuel tank and/or the fuel inlet. A system that provides a versatile and simple arrangement for a fuel inlet and fuel tank is therefore desirable.

SUMMARY

Systems and methods are disclosed of a fluid container configured to receive a fluid, with a filler neck configured to channel the fluid from an inlet into the fluid container. In some examples, a flexible hose connects the fluid container to the filler neck, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
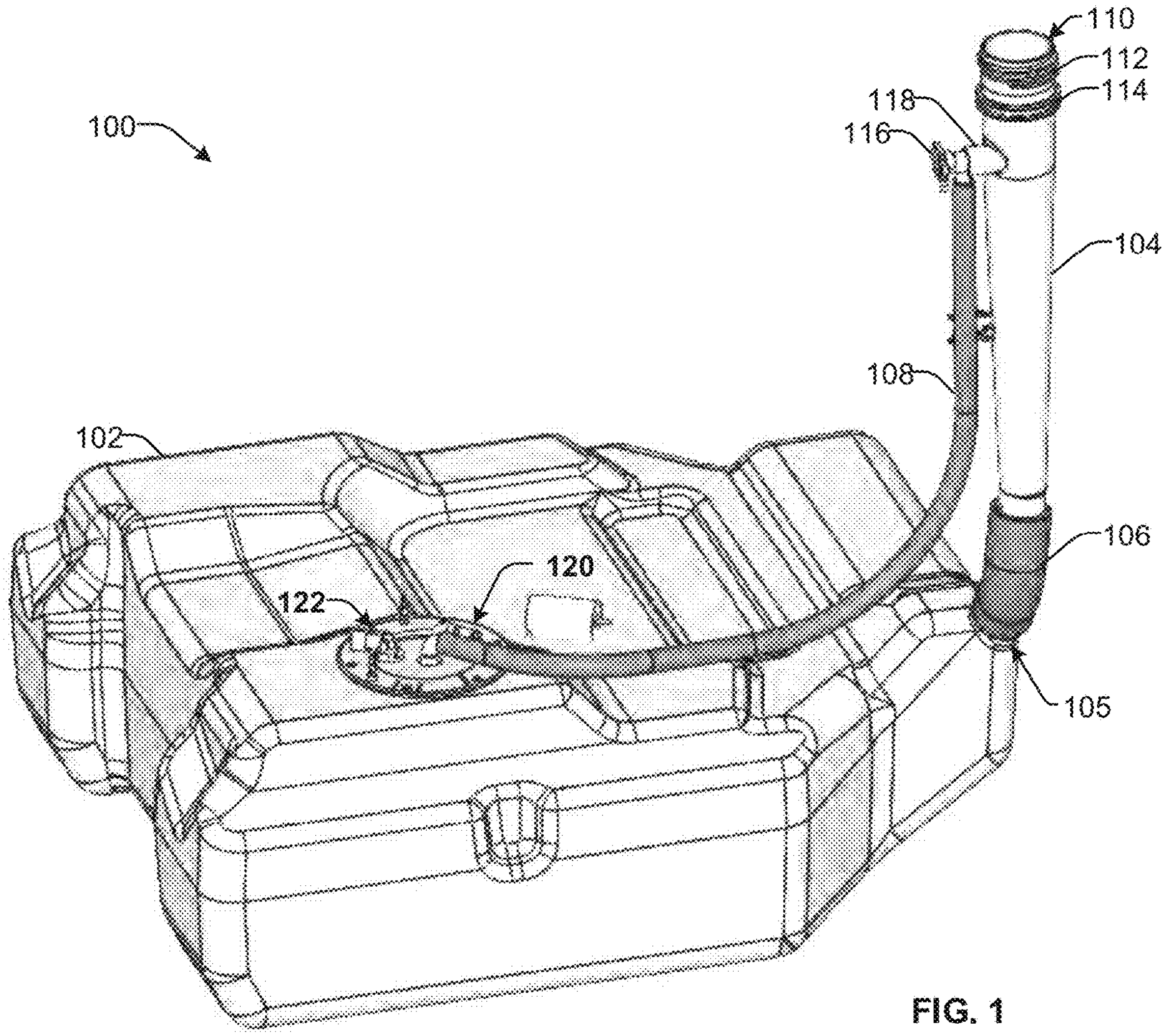
FIG. 1 illustrates an example fluid container system, in accordance with aspects of this disclosure.

Disclosed are examples of a fuel fill device connected to a fluid container system via a flexible hose. In some examples, a fluid container is configured to receive a fluid from a filler neck configured to channel the fluid from an inlet (e.g., of an external housing) into the fluid container.

In some examples, the fluid container system provides a multi-piece design that includes a fuel tank and separate yet connected filler neck. The multi-piece construction allows the fuel tank to be designed for holding bulk fuel while the filler neck is designed as a conduit for fuel transfer to the tank, such as from a fuel inlet.

Conventionally, engine driven systems, such as welding equipment, commonly use a one-piece fuel tank design. In particular, the fuel tank has a relatively large, integrated, and fixed fuel neck. The large fuel neck may allow for filling without the need for a secondary vent device or passageway. However, the large neck takes up a large amount of space within the enclosure and creates challenges in arranging system components, installing the components in a housing, aligning the fill neck with an inlet, and/or attempting to reduce the overall size of a machine. Moreover, the large fill neck is arranged in close proximity to an engine exhaust or muffler, subjecting the fill neck to heat and/or vibration, which may cause warping and/or other damage to the fill neck.

Separating the fuel tank and filler neck components allows individual elements to be processed differently (e.g., from different materials) for increased flexibility in manufacturing and/or assembly. For instance, cost-efficient methods and materials can be used to produce desirable features for one or both of the fuel tank and filler neck. In an example, the fuel tank can be manufactured by a low-cost blow mold technique, as the fuel tank is a relatively large component with few details. Conversely, the filler neck can be manufactured by an efficient injection mold technique, as the filler neck is a relatively small component with a number of detailed features that can be suitably created by injection molding.

The disclosed multi-piece approach simplifies the manufacture and assembly of the fluid container system. For instance, a fuel vent valve can act as a vent port for a hose connection, thereby eliminating a fitting required in conventional systems.

Further, a fuel tank manufactured separately from the filler neck can be packaged more efficiently, such as for shipping. This is a benefit over conventional systems, where the filler neck is manufactured as an integrated component arranged in a fixed arrangement with the fuel tank, and protrudes from the fuel tank making shipping and/or handling difficult.

In some disclosed examples, the multi-piece tank assembly is put together during final installation of the system, engine, machine, etc., being served by the fluid container system. This allows the fill neck to be adjusted to fit a variety of housings and/or accommodate offsets in the inlet position. In some examples, a flexible hose (e.g., rubber) can be used to connect the fuel tank to the filler neck. This allows the filler neck to be aligned with an inlet at the housing or cover of the associated system.

Furthermore, in conventional systems, a one piece tank and neck is subject to warp and it can be challenging to line-up with an inlet. Changes in the position or arrangement caused by warping can require costly machine re-work, such as if the fuel tank needs to be replaced due to fill neck excess movement or damage.

Connecting the fill neck to the tank via a flexible hose allows for a degree of flexibility when aligning the fill neck and/or fill tank during installation of components, including if the filler neck is to be replaced.

In some examples, the fuel vent valve may be connected (e.g., mechanically and/or electrically coupled) to a mechanical actuator. For instance, the mechanical actuator is configured to move (e.g., change in position and/or orientation) of the fuel vent valve in response to the change in position or orientation of the mechanical actuator, thereby adjusting venting from the fuel container via the fuel vapor vent tube.

In some examples, the fuel vent valve may be connected (e.g., mechanically and/or electrically coupled) to control circuitry. For instance, a change in position and/or orientation of the valve may be in response to a signal received from the control circuitry.

In some examples, the disclosed fluid container system provides a fuel tank (e.g., fluid container) for an engine driven welder/generator system.

Advantageously, and by contrast to conventional systems, the presently disclosed system provides multiple benefits, such as simplicity of arrangement and assembly, ability to retrofit into existing designs, and the flexibility to accommodate variations and/or changes in fuel inlet placement.

Other advantages include, for example, producing the fuel tank and filler neck separately allowing for a more cost effective manufacturing process. For instance, each part can be formed in a way to optimize materials and/or processes for the specific component (e.g., blow molding versus injection molding).

Further, separating components allows for fuel system parts (e.g., the filler neck) to be located away from high heat components (e.g., engine exhaust muffler, etc.), as the filler neck can be smaller, fit in a variety of tighter locations, and can be moved to a certain degree.

Moreover, the two-piece design allows for more compact transportation of both parts prior to assembly. In particular, the fixed orientation of fuel neck and fuel tank in conventional designs required custom packaging and specific arrangements for stacking and/or handing of the fuel system. The two-piece design allows for more components to be placed on a skid, requiring less storage, pallet, and/or floor space.

In disclosed examples, an engine driven welder/generator system comprising: an engine having a first end and a second end; an engine driven generator arranged at the first end of the engine; and a fluid container system for, comprising: a fluid container arranged below one or more of the engine or the generator and configured to receive a fluid; a filler neck configured to channel the fluid from an inlet into the fluid container, the filler neck arranged at the second end of the engine; and a flexible hose connecting the fluid container to the filler neck.

In some examples, an external housing configured to enclose one or more of the engine, the engine driven generator, the fluid container, or the filler neck.

In some examples, the external housing comprises a fuel inlet configured to secure an opening of the filler neck such that the opening extends from the external housing. In examples, one or more fasteners or a cap configured to secure the opening of the filler neck to the fuel inlet of the external housing. In examples, the flexible hose is configured to allow the filler neck to move, such that a position or orientation of the opening of the filler neck is variable relative to the fluid container.

In some examples, a fuel vapor vent connected to the fluid container and configured to exhaust fuel vapor from the fluid container displaced by the fluid. In examples, a valve coupling the fuel vapor vent to the fluid container. In examples, the fuel vapor vent is a conduit configured to channel fuel vapor gas from the valve to the filler neck. In examples, the valve is electrically coupled to a controller configured to provide a signal to the valve to control a change in position or orientation of the valve.

In some disclosed examples, an engine driven welder/generator system comprising: an engine comprising a muffler arranged at a first end of the engine; a fluid container configured to receive a fluid; a filler neck configured to channel the fluid from an inlet into the fluid container; and a flexible hose connecting the fluid container to the filler neck, wherein the filler neck is arranged at a second end of the engine opposite the first end.

In some examples, an external housing configured to enclose one or more of the engine, an engine driven generator, the fluid container, or the filler neck.

In some examples, the external housing comprises a fuel inlet configured to secure an opening of the filler neck such that the opening extends from the external housing.

In some examples, the fuel inlet extends through a top surface of the external housing at the second end of the engine opposite a generator arranged at the first end of the engine.

In some examples, the flexible hose comprises one or more of rubber, a polymer, or a composite.

In some examples, the fluid container or the filler neck contains a material comprising one or more of an epoxy, phenolic plastics, nylon, polyethylene, polystyrene, polypropylene, polyvinyl chloride, polyethylene terephthalate, thermoplastic elastomers, acrylonitrile styrene acrylate, acrylonitrile butadiene styrene, polyphenylene oxide, nylon/polyamides, or polycarbonate.

In some examples, the fluid container is manufactured via an injection molding technique. In some examples, the fluid container is manufactured via a blow molding technique. In some examples, the fluid container contains a first material and the filler neck contains a second material different from the first material.

In some disclosed examples, an engine driven welder/generator system comprising: an engine having a first end and a second end; an engine driven generator arranged at the first end of the engine; and a fluid container system for, comprising: a fluid container arranged below one or more of the engine or the generator and configured to receive a fluid; a filler neck configured to channel the fluid from an inlet into the fluid container; and a flexible hose connecting the fluid container to the filler neck, wherein the filler neck is arranged on the second end of the engine, wherein the second end of the engine is defined by a plane, the filler neck arranged opposite the engine relative to the plane.

In examples, the filler neck is removably attached to the fluid container by the flexible hose.

As used herein, the terms "welding-type system" and/or "welding system," includes any device capable of supplying power suitable for welding, plasma cutting, induction heating, CAC-A and/or hot wire welding/preheating (including laser welding and laser cladding), including inverters, converters, choppers, resonant power supplies, quasi-resonant power supplies, etc., as well as control circuitry and other ancillary circuitry associated therewith.

As used herein, the terms "welding-type power" and/or "welding power" refer to power suitable for welding, plasma cutting, induction heating, CAC-A and/or hot wire welding/preheating (including laser welding and laser cladding). As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, the terms "first" and "second" may be used to enumerate different components or elements of the same type, and do not necessarily imply any particular order.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein, the terms "welding parameter" includes one or more of voltage, current, power, wire feed speed, gas flow rate, pulse rate, workpiece thickness, workpiece material type, electrode type, welding process, travel speed, arc length, or joint type, as a list of non-limiting examples.

The term "power" is used throughout this specification for convenience, but also includes related measures such as energy, current, voltage, resistance, conductance, and enthalpy. For example, controlling "power" may involve controlling voltage, current, energy, resistance, conductance, and/or enthalpy, and/or controlling based on "power" may involve controlling based on voltage, current, energy, resistance, conductance, and/or enthalpy.

As used herein, the term "valve" includes any of numerous mechanical devices by which the flow of liquid, gas, or loose material in bulk may be started, stopped, or regulated by a movable part that opens, shuts, or partially obstructs one or more ports or passageways, which further includes the movable parts of such a device.

As used herein, a "circuit," or "circuitry," includes any analog and/or digital components, power and/or control elements, such as a microprocessor, digital signal processor (DSP), software, and the like, discrete and/or integrated components, or portions and/or combinations thereof.

The terms "control circuit," "control circuitry," and/or "controller," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may be located on one or more circuit boards that form part or all of a controller, and are used to control a welding process, a device such as a power source or wire feeder, and/or any other type of welding-related system.

As used herein, the term "welding mode," "welding process," "welding-type process" or "welding operation" refers to the type of process or output used, such as current-controlled (CC), voltage-controlled (CV), pulsed, gas metal arc welding (GMAW), flux-cored arc welding (FCAW), gas tungsten arc welding (GTAW), shielded metal arc welding (SMAW), spray, short circuit, and/or any other type of welding process.

FIG. 1 is a block diagram of an example fluid container system 100. As shown, the system 100 includes a first component or fluid container 102 configured to receive a fluid via a second component or filler neck 104. As shown, the filler neck 104 is configured to channel the fluid from an opening 110 into the fluid container 102. The filler neck 104 is coupled to the fuel container 102 via a conduit or flexible hose 106, which can be formed of one or more of rubber, a polymer, or a composite material, for example.

In some examples, the flexible hose 106 is configured to allow the filler neck 104 to move relative to the fuel container 102. For instance, by moving the fuel neck 106 about a fuel container connector 105, a position or orientation of the opening 110 can change, accommodating flexibility in assembly in an enclosure. The flexible hose 106 allows for flexibility not available to conventional systems, where the fuel neck is rigidly attached to the fuel container.

Figure 3:
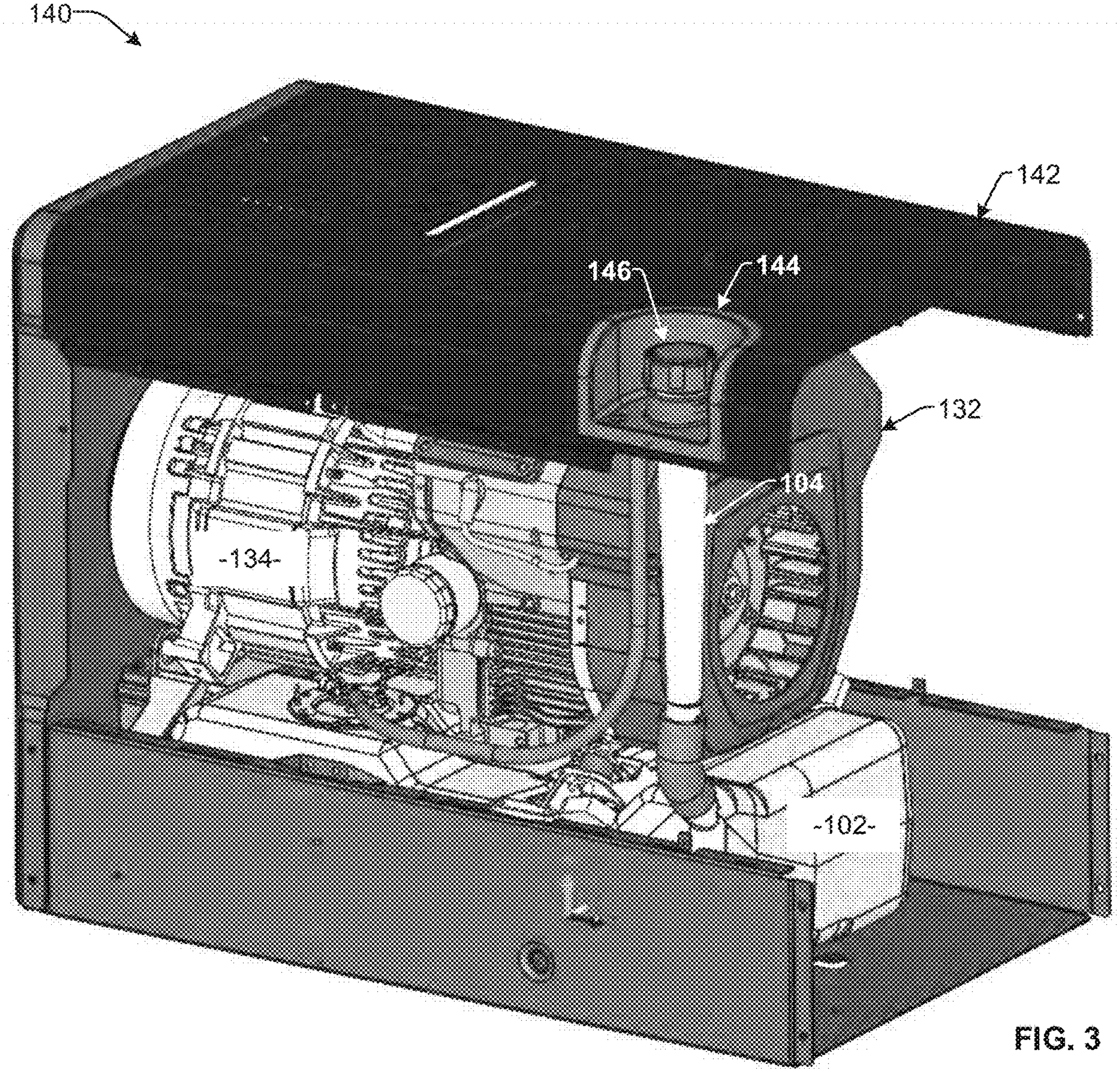
FIG. 3 illustrates the example fluid container system incorporated with the engine driven welder/generator system of FIG. 2 contained within an external housing, in accordance with aspects of this disclosure.

In some examples, the opening 110 of the filler neck 104 is configured to extend from and/or be secured to an external panel or housing (see, e.g., FIG. 3). The opening 110 may include a fastener, such as threads, to receive a cap or to secure the opening 110 to a fuel inlet of the external housing. An O-ring or grommet 114 is arranged to provide a liquid tight seal between the external housing and the interior of the housing.

As shown, a fuel vapor vent tube 108 is connected to the fluid container 102 at a plate 120 (or other connection point), such that fuel vapor is vented from the fluid container 102 when displaced by fluid (e.g., fuel). In some examples, one or more ports are connected to the plate 120, such as to provide fuel to an engine.

The fuel vapor vent tube 108 connects to a portion of the fuel neck 104 distal to the flexible tube 106 via a port 118. For example, the fuel vapor vent tube 108 can connect directly onto the port 118, and/or be coupled via a valve, vent, or valve coupling 116. In some examples, the valve 116 is passive, whereas in some examples the valve 116 is electronically controlled.

In some examples, the fluid container 102 and the fuel neck 104 are manufactured or formed by a common or similar process or technique, whereas in other examples the components are manufactured or formed by a different process or technique. For example, one or both of the fluid container 102 or the fuel neck 104 can be manufactured via an injection molding technique, or a blow molding technique.

In some examples, the fluid container contains a first material and the filler neck contains a second material different from the first material, the first or second material selected from a non-limiting list containing one or more of an epoxy, phenolic plastics, nylon, polyethylene, polystyrene, polypropylene, polyvinyl chloride, polyethylene terephthalate, thermoplastic elastomers, acrylonitrile styrene acrylate, acrylonitrile butadiene styrene, polyphenylene oxide, nylon/polyamides, or polycarbonate.

Figure 2:
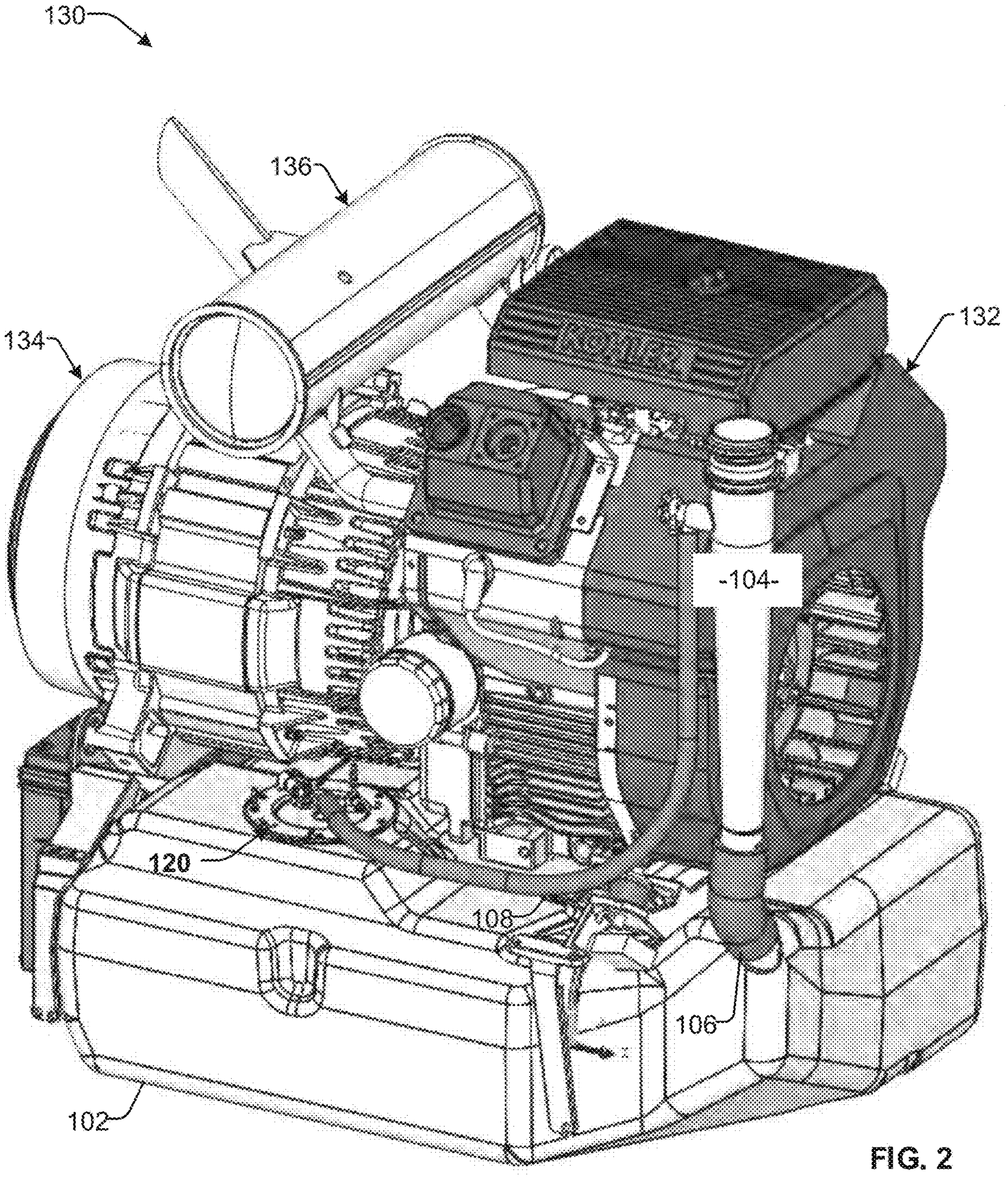
FIG. 2 illustrates an example fluid container system incorporated with an engine driven welder/generator system, in accordance with aspects of this disclosure.

FIG. 2 illustrates an example engine driven welder/generator system 130 that includes the fluid container system 100. As shown, the system 130 includes an engine 132 with a muffler 136 arranged at a first end of the engine 132. A generator 134 is coupled to the engine 132 (e.g., directly and/or via one or more transmission devices, such as a clutch, gear, and/or belt). In the example of FIG. 2, the fluid container 102 is arranged below the engine 132 and the generator 134, either to support the engine and generator, or fitted within an enclosure (see, e.g., FIG. 3).

As shown, the filler neck 104 is arranged at a second end of the engine 132 opposite the first end. In this arrangement, the filler neck 104 is separated from the muffler 136 by a distance equal to or greater than the length of the engine 132. For instance, during operation, the engine 132 is configured to exhaust hot air via the muffler 136. In conventional systems, part of the fluid containment system may be arranged near and/or in contact with the muffler, which can degrade system materials, and/or increase the temperature of the fluid and/or exhaust. By separating the filler neck 104 from the muffler 136, damage is less likely to occur.

FIG. 3 illustrates the example engine driven welder/generator system 130 contained within an external housing 140. As shown, the external housing 140 includes one or more panels including, but not limited to, a top panel 142, a base panel 144, a front or back panel 146, and one or more side panels (not shown). In the example of FIG. 3, the top panel 142 includes a fuel inlet 148, which may be configured as a receptacle, box, or a cut-away portion within the top panel 142 to receive and/or secure the opening 110 of the filler neck 104.

For example, the opening 110 extends from the fuel inlet 148 and is secured thereto (e.g., via a fastener, such as threads), to receive a cap 147. In some examples, the O-ring or grommet 114 is arranged between a portion of the fuel inlet 148 and the fuel neck 104 to provide a liquid tight seal between the external housing and the fuel neck 104.

Additionally or alternatively, the fuel container connector 105 and/or the filler neck 104 are arranged at the second end of the engine 132, with the second end of the engine 132 defined by a plane substantially parallel to the front or back panel 146. The filler neck 104 is arranged opposite the engine 132 relative to the plane, providing a degree of clearance between the engine 132 and the fuel neck 104.

Figure 4A:
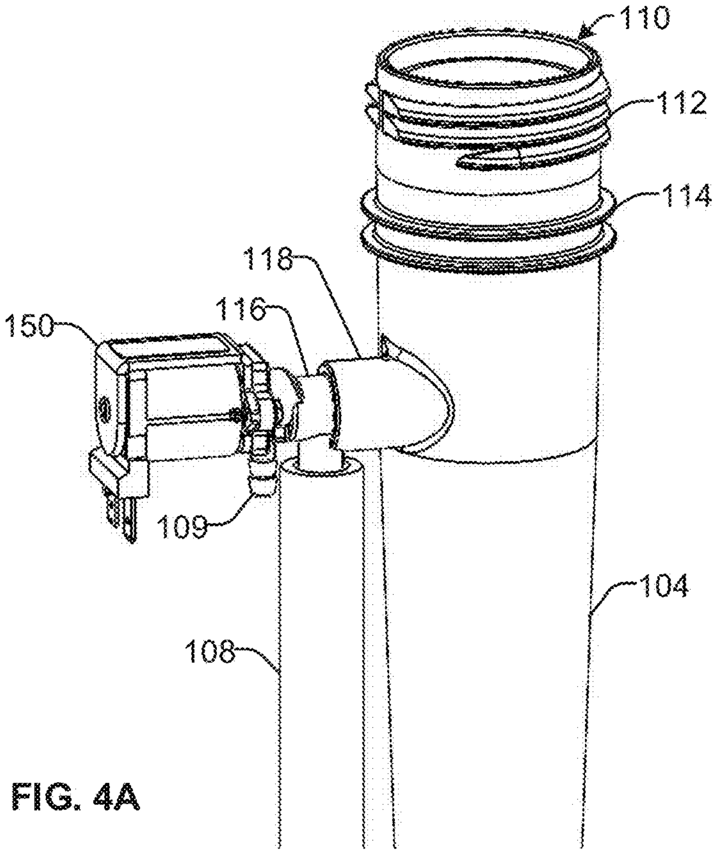
FIGS. 4A and 4B illustrate views of an example fluid filler neck, in accordance with aspects of this disclosure.
Figure 4B:
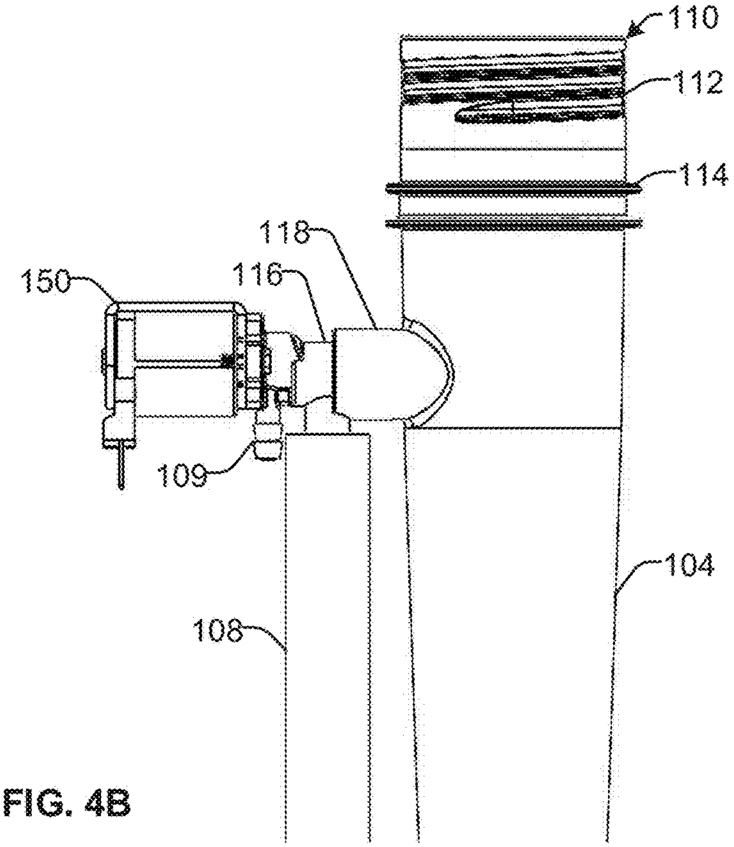

FIGS. 4A and 4B illustrate detailed views of the example fluid filler neck 104. As shown, the filler neck 104 includes an extension portion 152. The portion 152 includes the O-ring or grommet 114, which may include one or more ledges or surface 154 to create a seal between the O-ring or grommet 114 and the receptacle 148 and/or the cap 147. One or more fasteners (e.g., threads) can be arranged at the top of the portion 152 to accept the cap 147.

The fuel vapor vent tube 108 can connect directly onto the port 118, and/or be coupled via a valve, vent, or valve coupling 116. In some examples, the valve 116 is passive. In some examples, the valve 116 is electronically and/or mechanically controlled by a device 150 (e.g., a valve, mechanical actuator, mechanical lever, etc.). As shown in FIGS. 4A and 4B, the valve 116 can be arranged at the interface between the fuel vapor vent tube 108 and the port 118, within the port 118 itself, and/or at an end of the vent tube 108, partially or fully blocking the pathway for vented gas vapors.

In some examples, the device 150 may include one or more electrical contacts 158, connected to a power source and/or control circuitry to control the valve 116. For instance, the device 150 can be controlled to fully or partially open or close the valve 116, to adjust venting from the fuel container 102 via the fuel vapor vent tube 108. In some examples, a vent valve 109 can be connected to the engine 132 via one or more conduits (not shown). In particular, the vent valve 109 can be opened to tube 108 and/or port 118 (and to fuel neck 104) by activation of the valve 116 by the device 150. This allows vapor to vent to the engine 132.

As utilized herein, "and/or" means any one or more of the items in the list joined by "and/or". As an example, "x and/or y" means any element of the three-element set {(*x*), (*y*), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. An engine driven welder/generator system comprising:
- an engine having a first end and a second end;
- an engine driven generator arranged at the first end of the engine; and
- a fluid container system, comprising:
  - a first component of the fluid container system configured to receive a fluid;
  - a second component of the fluid container system configured to channel the fluid from an inlet into the first component, the second component arranged at the second end of the engine; and
  - a conduit connecting the first component to the second component.

2. The system of claim 1, further comprising an external housing configured to enclose one or more of the engine, the engine driven generator, the first component, or the second component.

3. The system of claim 2, wherein the external housing comprises a fuel inlet configured to secure an opening of the conduit such that the opening extends from the external housing.

4. The system of claim 3, further comprising one or more fasteners or a cap configured to secure the opening of the conduit to the fuel inlet of the external housing.

5. The system of claim 3, wherein the second component is a filler neck, and the conduit is a flexible hose configured to allow the filler neck to move, such that a position or orientation of the opening of the filler neck is variable relative to the first component.

6. The system of claim 1, wherein the first component is a fluid container, the system further comprising a fuel vapor vent connected to the fluid container and configured to exhaust fuel vapor from the fluid container displaced by the fluid.

7. The system of claim 6, further comprising a valve coupling the fuel vapor vent to the fluid container.

8. The system of claim 7, wherein the fuel vapor vent is a second conduit configured to channel fuel vapor gas from the valve to the conduit.

9. The system of claim 7, wherein the valve is electrically coupled to a controller configured to provide a signal to the valve to control a change in position or orientation of the valve.

10. An engine driven welder/generator system comprising:
- an engine comprising a muffler arranged at a first end of the engine;
- a fluid container configured to receive a fluid;
- a filler neck configured to channel the fluid from an inlet into the fluid container; and
- a flexible hose connecting the fluid container to the filler neck, wherein the filler neck is arranged at a second end of the engine opposite the first end.

11. The system of claim 10, further comprising an external housing configured to enclose one or more of the engine, an engine driven generator, the fluid container, or the filler neck.

12. The system of claim 11, wherein the external housing comprises a fuel inlet configured to secure an opening of the filler neck such that the opening extends from the external housing.

13. The system of claim 10, wherein the flexible hose comprises one or more of rubber, a polymer, or a composite.

14. The system of claim 10, wherein the fluid container or the filler neck contains a material comprising one or more of an epoxy, phenolic plastics, nylon, polyethylene, polystyrene, polypropylene, polyvinyl chloride, polyethylene terephthalate, thermoplastic elastomers, acrylonitrile styrene acrylate, acrylonitrile butadiene styrene, polyphenylene oxide, nylon/polyamides, or polycarbonate.

15. The system of claim 10, wherein the fluid container is manufactured via an injection molding technique.

16. The system of claim 10, wherein the fluid container is manufactured via a blow molding technique.

17. The system of claim 10, wherein the fluid container contains a first material and the filler neck contains a second material different from the first material.

18. An engine driven welder/generator system comprising:

an engine having a first end and a second end;

an engine driven generator arranged at the first end of the engine; and a fluid container system, comprising:

a fluid container arranged at least partially below one or more of the engine or the generator and configured to receive a fluid;

a filler neck configured to channel the fluid from an inlet into the fluid container; and a flexible hose connecting the fluid container to the filler neck, wherein the filler neck is arranged on the second end of the engine opposite the generator.

19. The system of claim 18, wherein the second end of the engine is defined by a plane, the filler neck arranged opposite the engine relative to the plane.

20. The system of claim 18, wherein the filler neck is removably attached to the fluid container by the flexible hose.

* * * * *